US009270221B2

United States Patent
Zhao

(10) Patent No.: US 9,270,221 B2
(45) Date of Patent: Feb. 23, 2016

(54) METHOD FOR SETTING PARAMETERS OF ELECTRONICALLY-COMMUTATED MOTOR FOR USE AS PERMANENT-SPLIT CAPACITOR MOTOR

(71) Applicant: ZHONGSHAN BROAD-OCEAN MOTOR CO., LTD., Zhongshan (CN)

(72) Inventor: Yong Zhao, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 78 days.

(21) Appl. No.: 14/328,670

(22) Filed: Jul. 10, 2014

(65) Prior Publication Data

US 2015/0077035 A1    Mar. 19, 2015

(30) Foreign Application Priority Data

Sep. 16, 2013   (CN) .......................... 2013 1 0422664

(51) Int. Cl.
*H02P 25/04*       (2006.01)
*H02P 23/00*       (2006.01)

(52) U.S. Cl.
CPC ............ *H02P 25/04* (2013.01); *H02P 23/0063* (2013.01); *H02P 23/0072* (2013.01)

(58) Field of Classification Search
USPC .......................... 318/558, 700, 812, 816, 817
See application file for complete search history.

(56) References Cited

U.S. PATENT DOCUMENTS

| | | | | |
|---|---|---|---|---|
| 4,721,898 A | * | 1/1988 | Carter | .................... H02P 25/26 318/821 |
| 6,066,934 A | * | 5/2000 | Kaitani | ................. H02P 21/145 318/490 |
| 8,917,045 B2 | * | 12/2014 | Durfee | ...................... G06F 8/60 318/490 |

* cited by examiner

*Primary Examiner* — Bentsu Ro
(74) *Attorney, Agent, or Firm* — Matthias Scholl, PC; Matthias Scholl

(57) ABSTRACT

A method for setting parameters of an ECM motor, the method including: 1) energizing the motor and measuring the AC input voltage Vac; 2) allowing the motor to run according to recorded rotational direction data and rotational speed data when Vac>Vset1; 3) enabling the motor to enter a programming state of rotational direction data and rotational speed data when Vac<Vset2; 4) conducting the programming state including operating the motor in a rotational speed state, a rotational direction state, or a combined state thereof, with each state lasting for a time of T, respectively; and 5) determining that the programming state is proper when the user turns off the power; and storing the programming state in operation at the moment when the power is turned off as normal operating parameter of the motor.

15 Claims, 7 Drawing Sheets

METHOD FOR SETTING PARAMETERS OF ELECTRONICALLY-COMMUTATED MOTOR FOR USE AS PERMANENT-SPLIT CAPACITOR MOTOR

CROSS-REFERENCE TO RELATED APPLICATIONS

Pursuant to 35 U.S.C. §119 and the Paris Convention Treaty, this application claims the benefit of Chinese Patent Application No. 201310422664.2 filed Sep. 16, 2013, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

1. Field of the Invention

The invention relates to a method for setting parameters of an electronically commutated motor (ECM) for use as a permanent-split capacitor (PSC) motor.

2. Description of the Related Art

As shown in FIG. 1, a typical PSC motor used as an outdoor unit of a civil HVAC system generally operates at a single rotational speed and necessitates a supply voltage of between 208 V and 230 V. The PSC motor includes a six-pole type and an eight-pole type corresponding to a high rotational speed=1075 rpm and a low rotational speed=825 rpm, respectively; besides, the PSC motor is provided with a clockwise direction CW and a counter clockwise direction CCW, thereby forming four combined states. The PSC motor has reasonable efficiency when it runs at the high rotational speed, however, the efficiency thereof is decreased to 20% below when it runs at the low rotational speed.

Most updated HVAC systems adopt an ECM motor because the power of the ECM motor is approximately proportional to the cube of the rotational speed while the power of the PSC motor is approximately proportional to the rotational speed; and when the rotational speed of the motor decreases, the power of the ECM motor is lower than the power of the PSC motor within the whole range of the rotational speed.

It is desired to develop a method for setting parameters of an ECM motor for enabling the ECM motor to substitute the six-pole or the eight-pole PSC motor directly without changing the original arrangement of wires and connection relationship of the original HVAC system, thereby realizing an advantage of the ECM motor.

SUMMARY OF THE INVENTION

In view of the above-described problems, it is one objective of the invention to provide a first method for setting parameters of an ECM motor for use as a PSC motor.

It is another objective of the invention to provide a second method for setting parameters of an ECM motor for use as a PSC motor.

To achieve the above objective, in accordance with one embodiment of the invention, there is provided a first method for setting parameters of an ECM motor for use as a PSC motor. The ECM motor comprises: a stator assembly, a rotor assembly, a housing assembly, and a motor controller. The motor controller comprises: a power circuit, a microprocessor, an inverter circuit, and a voltage measuring circuit. The voltage measuring circuit measures an AC input voltage Vac of an external input power. The power circuit supplies power to each circuit part. The voltage measuring circuit inputs a measured voltage signal into the microprocessor. The microprocessor controls the inverter circuit to drive the stator assembly. The method comprises the following steps:

1) energizing the motor and measuring the AC input voltage Vac;
2) allowing the motor to run according to recorded rotational direction data and rotational speed data when Vac>Vset1, in which, Vset1 represents a first set value of AC voltage;
3) enabling the motor to enter a programming state of rotational direction data and rotational speed data when Vac<Vset2, in which, Vset2 represents a second set value of AC voltage;
4) conducting the programming state comprising operating the motor in a rotational speed state, a rotational direction state, or a combined state thereof, with each state lasting for a time of T, respectively; and
5) determining that the programming state is proper when the user turns off the power; and storing the programming state in operation at the moment when the power is turned off as a normal operating parameter of the motor.

In a class of this embodiment, the programming state comprises:

a first programming state: setting the rotational direction to be CW and the rotational speed to be H; operating the motor for the time of T, and assuming the state to be proper for the user when the user turns off the power; and storing the rotational direction=CW and the rotational speed=H as the normal operating parameter of the motor;

a second programming state: setting the rotational direction to be CW and the rotational speed to be L; operating the motor for the time of T, and assuming the state to be proper for the user when the user turns off the power; and storing the rotational direction=CW and the rotational speed=L as the normal operating parameter of the motor;

a third programming state: setting the rotational direction to be CCW and the rotational speed to be L; operating the motor for the time of T, and assuming the state to be proper for the user when the user turns off the power; and storing the rotational direction=CCW and the rotational speed=L as the normal operating parameter of the motor; and a fourth programming state: setting the rotational direction to be CCW and the rotational speed to be H; operating the motor for the time of T, and assuming the state to be proper for the user when the user turns off the power; and storing the rotational direction=CCW and the rotational speed=H as the normal operating parameter of the motor.

In a class of this embodiment, the method further comprises: selecting proper rotational direction data and proper rotational speed data when the user does not turn off the power in step 5), repeating step 4) and recycling the first programming state, the second programming state, the third programming state, and the fourth programming state until the user turns off the power; and selecting corresponding rotational direction data and rotational speed data of a certain programming state.

In a class of this embodiment, Vset1 is larger than or equal to 187 V AC voltage, and Vset2 is smaller than or equal to 138 V AC voltage.

In a class of this embodiment, Vset1 is between 208 V and 230 VAC voltage, and Vset2 is between 115 V and 120 VAC voltage.

In a class of this embodiment, the rotational direction data CW represents a clockwise direction in relation to a leading direction. The rotational direction data CCW represents a counter clockwise direction in relation to the leading direction. The rotational speed data H represents a high rotational speed in a range of between 975 rpm and 1175 rpm. The rotational speed data L represents a low rotational speed in a range of between 725 rpm and 925 rpm.

In a class of this embodiment, the rotational speed data H is 1075 rpm; and the rotational speed data L is 825 rpm.

In a class of this embodiment, the time T for each of the first programming state, the second programming state, the third programming state, and the fourth programming state is less than 15 minutes.

In accordance with one embodiment of the invention, there is provided a second method for setting parameters of an ECM motor for use as a PSC motor. The ECM motor comprises: a stator assembly, a rotor assembly, a housing assembly, and a motor controller. The motor controller comprises: a power circuit, a microprocessor, an inverter circuit, and a voltage measuring circuit. The voltage measuring circuit measures a DC bus voltage Vdc of an output end of the power circuit. The power circuit supplies power to each circuit part. The voltage measuring circuit inputs a measured voltage signal into the microprocessor. The microprocessor controls the inverter circuit to drive the stator assembly. The method comprises the following steps:

1) energizing the motor and measuring the DC bus voltage Vdc;
2) allowing the motor to run according to recorded rotational direction data and rotational speed data when Vdc>Vset3, in which, Vset3 represents a third set value of DC voltage;
3) enabling the motor to enter a programming state of rotational direction data and rotational speed data when Vdc<Vset4, in which, Vset4 represents a fourth set value of DC voltage;
4) conducting the programming state comprising operating the motor in a rotational speed state, a rotational direction state, or a combined state thereof, with each state lasting for a time of T, respectively; and
5) determining that the programming state is proper when the user turns off the power; and storing the programming state in operation at the moment when the power is turned off as a normal operating parameter of the motor.

In a class of this embodiment, the programming state comprises:

a first programming state: setting the rotational direction to be CW and the rotational speed to be H; operating the motor for the time of T, and assuming the state to be proper for the user when the user turns off the power; and storing the rotational direction=CW and the rotational speed=H as the normal operating parameter of the motor;

a second programming state: setting the rotational direction to be CW and the rotational speed to be L; operating the motor for the time of T, and assuming the state to be proper for the user when the user turns off the power; and storing the rotational direction=CW and the rotational speed=L as the normal operating parameter of the motor;

a third programming state: setting the rotational direction to be CCW and the rotational speed to be L; operating the motor for the time of T, and assuming the state to be proper for the user when the user turns off the power; and storing the rotational direction=CCW and the rotational speed=L as the normal operating parameter of the motor; and a fourth programming state: setting the rotational direction to be CCW and the rotational speed to be H; operating the motor for the time of T, and assuming the state to be proper for the user when the user turns off the power; and storing the rotational direction=CCW and the rotational speed=H as the normal operating parameter of the motor.

In a class of this embodiment, the method further comprises: selecting proper rotational direction data and proper rotational speed data when the user does not turn off the power in step 5); repeating step 4) and recycling the first programming state, the second programming state, the third programming state, and the fourth programming state until the user turns off the power; and selecting corresponding rotational direction data and rotational speed data of a certain programming state.

In a class of this embodiment, Vset3 is larger than or equal to $\sqrt{2} \times 187$ V DC voltage, and Vset4 is smaller than or equal to $\sqrt{2} \times 138$ V DC voltage.

In a class of this embodiment, the rotational direction data CW represents a clockwise direction in relation to a leading direction. The rotational direction data CCW represents a counter clockwise direction in relation to the leading direction. The rotational speed data H represents a high rotational speed in a range of between 975 rpm and 1175 rpm. The rotational speed data L represents a low rotational speed in a range of between 725 rpm and 925 rpm.

In a class of this embodiment, the rotational speed data H is 1075 rpm. The rotational speed data L is 825 rpm.

In a class of this embodiment, the time T for each of the first programming state, the second programming state, the third programming state, and the fourth programming state is less than 15 minutes.

Advantages according to embodiments of the invention are summarized as follows:

1) According to the PSC motor for the outdoor application of the HVAC system, the PSC motor generally operates at a signal speed operation and necessitates a supply voltage of between 208 V and 230 V. The PSC motor comprises two types of different rotational speeds, that is, a first PSC motor type having 6 poles and running at the rotational speed of 1075 rpm and a second PSC motor type having 8 poles and running at the rotational speed of 825 rpm. By combining the clockwise and counterclockwise rotational direction, four combined states are provided. Thus, the field debugging of the ECM motor for use as the PSC motor is very simple and convenient. The ECM motor is energized and the DC bus voltage Vdc or the AC input voltage Vac is measured. When the DC bus voltage Vdc or the AC input voltage Vac is larger than a certain set value, the motor runs at a normal working state according to the rotational direction data and the rotational speed data stored and recorded. When the DC bus voltage Vdc or the AC input voltage Vac is smaller than a certain set value, the motor enters a programming state of the rotational direction data and the rotational speed data. Four programming states are provided. The first programming state is setting the rotational direction to be CW and the rotational speed to be H; the second programming state is setting the rotational direction to be CW and the rotational speed to be L; the third programming state is setting the rotational direction to be CCW and the rotational speed to be L; and the second programming state is setting the rotational direction to be CCW and the rotational speed to be H. When the user turns off the power at a certain programming state, it is assumed that the state is proper for the user. The rotational direction data and the rotational speed data corresponding to the programming state are stored and recorded as the normal operating parameters of the motor.

When the user does not turn off the power at the four programming states, the proper rotational direction data and proper rotational speed data are selected, and the motor re-enters the first programming state, the second programming state, the third programming state, and the fourth programming state, respectively, and cycles the four programming states until the user turns off the power. The rotational direction data and rotational speed data corresponding to a certain programming state are selected, thereby being simple and convenient for the debugging.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for setting parameters of an ECM motor for use as a PSC motor are described below. It should be noted that the following examples are intended to describe and not to limit the invention.

Figure 1:
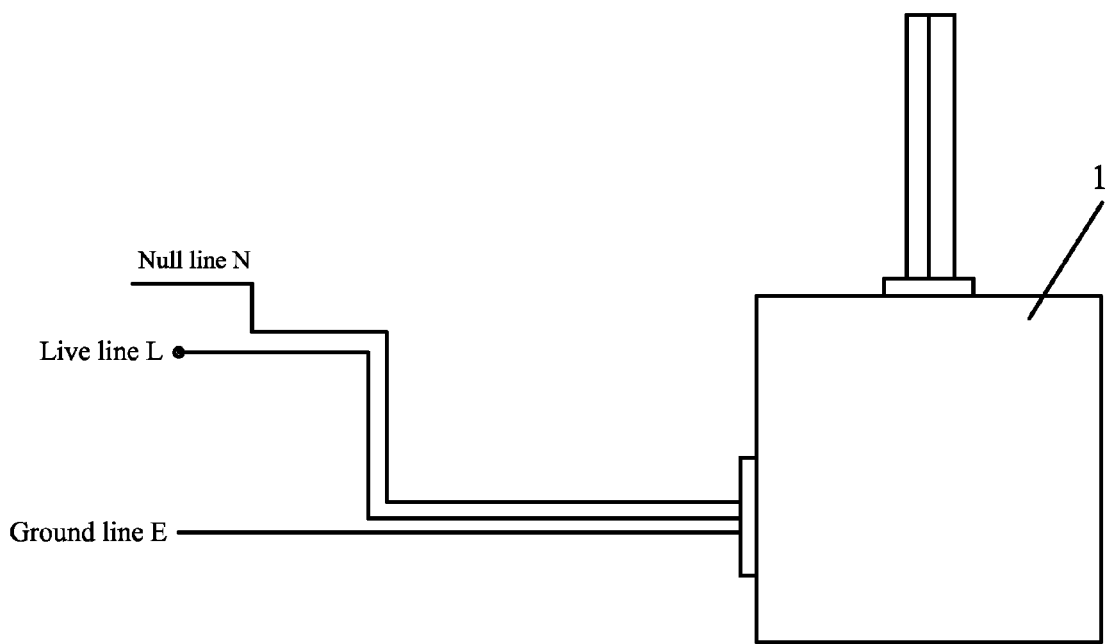
FIG. 1 is a wiring diagram of a PSC motor used in an outdoor unit of a conventional HVAC conditioning fan system.

As shown in FIG. 1, as an outdoor unit of a conventional HVAC air conditioning fan system, a PSC motor is an AC motor 1. An input end of the AC motor 1 is provided with power lines comprising a null line N, a ground line E, and a live line L.

Figure 2:
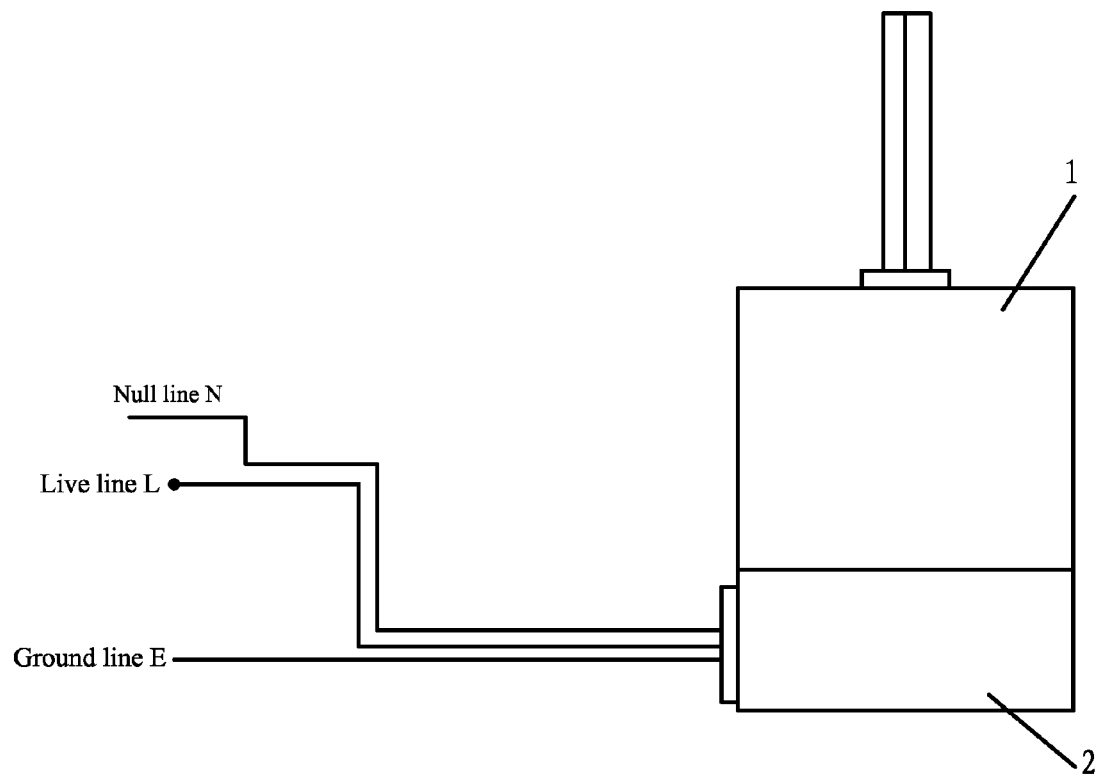
FIG. 2 is a structure diagram of an ECM motor for use as an outdoor PSC motor according to one embodiment of the invention.
Figure 3:
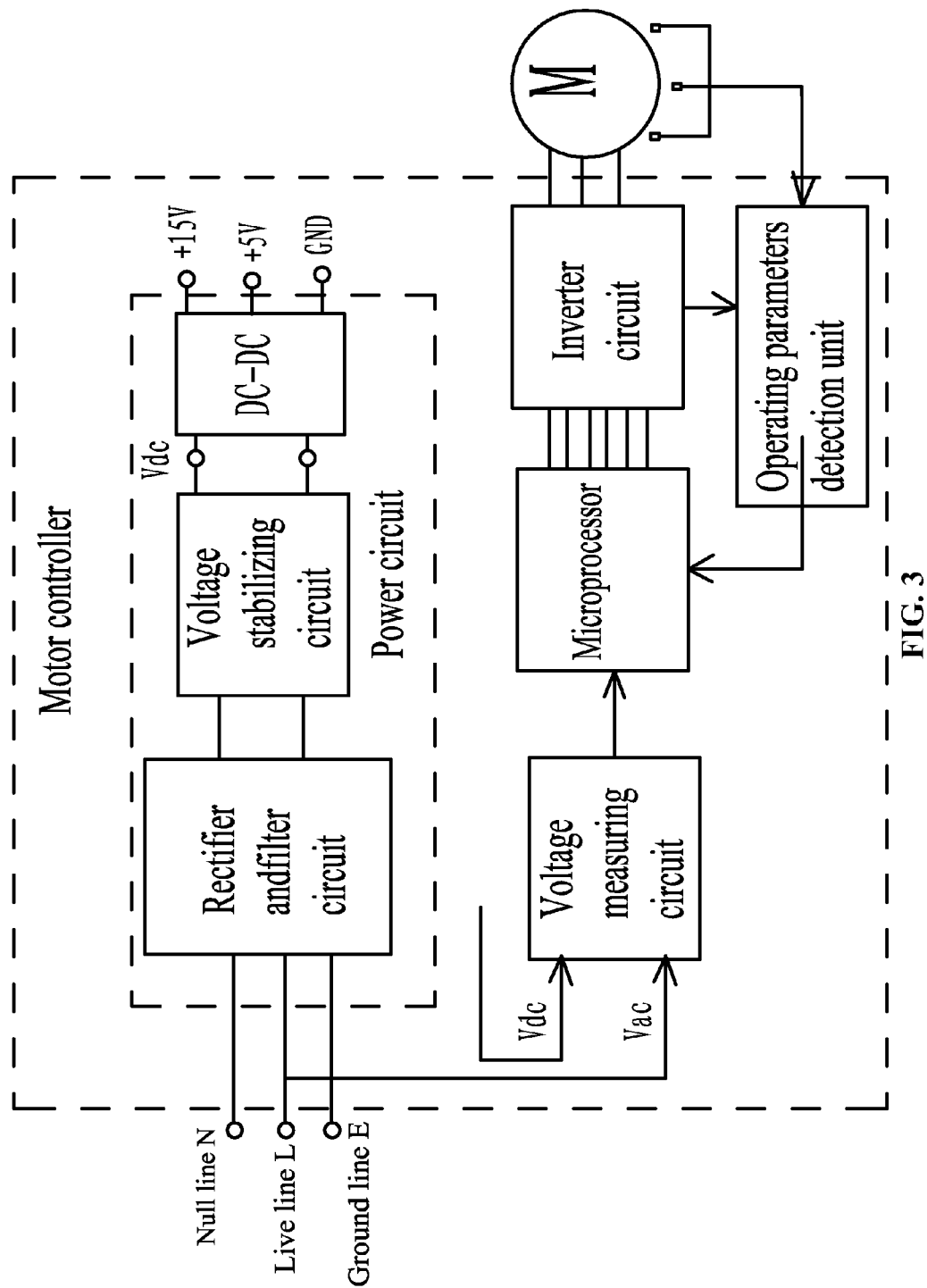
FIG. 3 is a circuit block diagram of a controller of an ECM motor for use as an outdoor PSC motor according to one embodiment of the invention.

An ECM motor for use as the PSC motor of the outdoor unit is shown in FIG. 2. The ECM motor comprises: a motor body 1 and a motor controller 2. The motor body 1 comprises: a stator assembly, a rotor assembly, a bearing system, and a housing assembly; in which, the stator assembly further comprises: a stator core, an end insulation, and a coil winding. As shown in FIG. 3, the motor controller 2 comprises a circuit board integrated with electronic components. The circuit board comprises: a power circuit, a microprocessor, an inverter circuit, an operating parameters detection unit, and a voltage measuring circuit. An AC input voltage Vac of an external input power is measured by the voltage measuring circuit. The power circuit supplies power for corresponding circuit. The measured voltage signal is input into the microprocessor by the voltage measuring circuit. The inverter circuit is controlled by the microprocessor to drive the stator assembly. The rotor position data and electric data of the coil winding are input into the microprocessor by the operating parameters detection unit. To substitute the present PSC motor, it is desired to use the ECM motor to directly substitute the PSC motor without or as little as possible by changing the original arrangement of wirings and connection relations, thereby realizing an advantage of the ECM motor while non-obviously changing the original HVAC system. Thus, an input end of the motor controller 2 is only provided with the power line comprising a null line N, a ground line E, and a live line L. An input end of the power circuit is connected to the AC input voltage Vac, and an output end of the power circuit comprises a DC bus voltage Vdc output, a +15V voltage output, and a +5V voltage output. Program module for controlling the operation of the motor is stored by the microprocessor. When the motor is energized, the program module is utilized by the microprocessor to control the operation of the motor. Besides, the rotational direction data and the rotational speed data of normal operating parameters are stored. During the operation of the motor, the rotational direction data and the rotational speed data are utilized by the program module for controlling the operation of the motor. To changing parameters (the rotational direction data and the rotational speed data), it just requires inputting a low voltage AC into the motor controller and enabling the motor to enter the programming state of the rotational direction data and the rotational speed data. When the low voltage AC power of the motor controller is turned off by the user, it is assumed that the state is proper for the user; the rotational direction data and the rotational speed data are recorded and stored as the normal operating parameters of the motor.

Example 1

Figure 4:
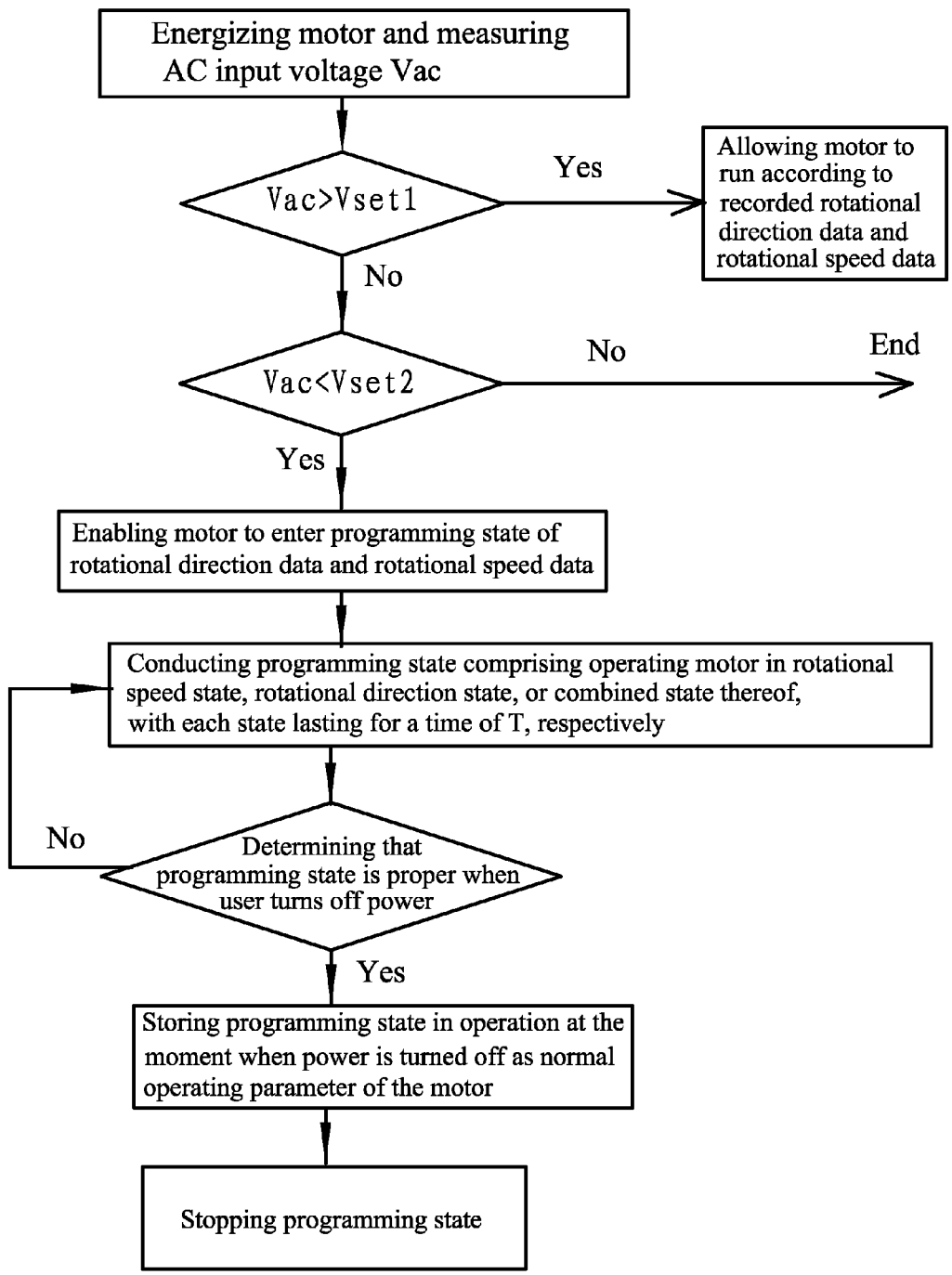
FIG. 4 is a first control flow diagram of a first method for setting parameters of an ECM motor according to one embodiment of the invention.
Figure 6:
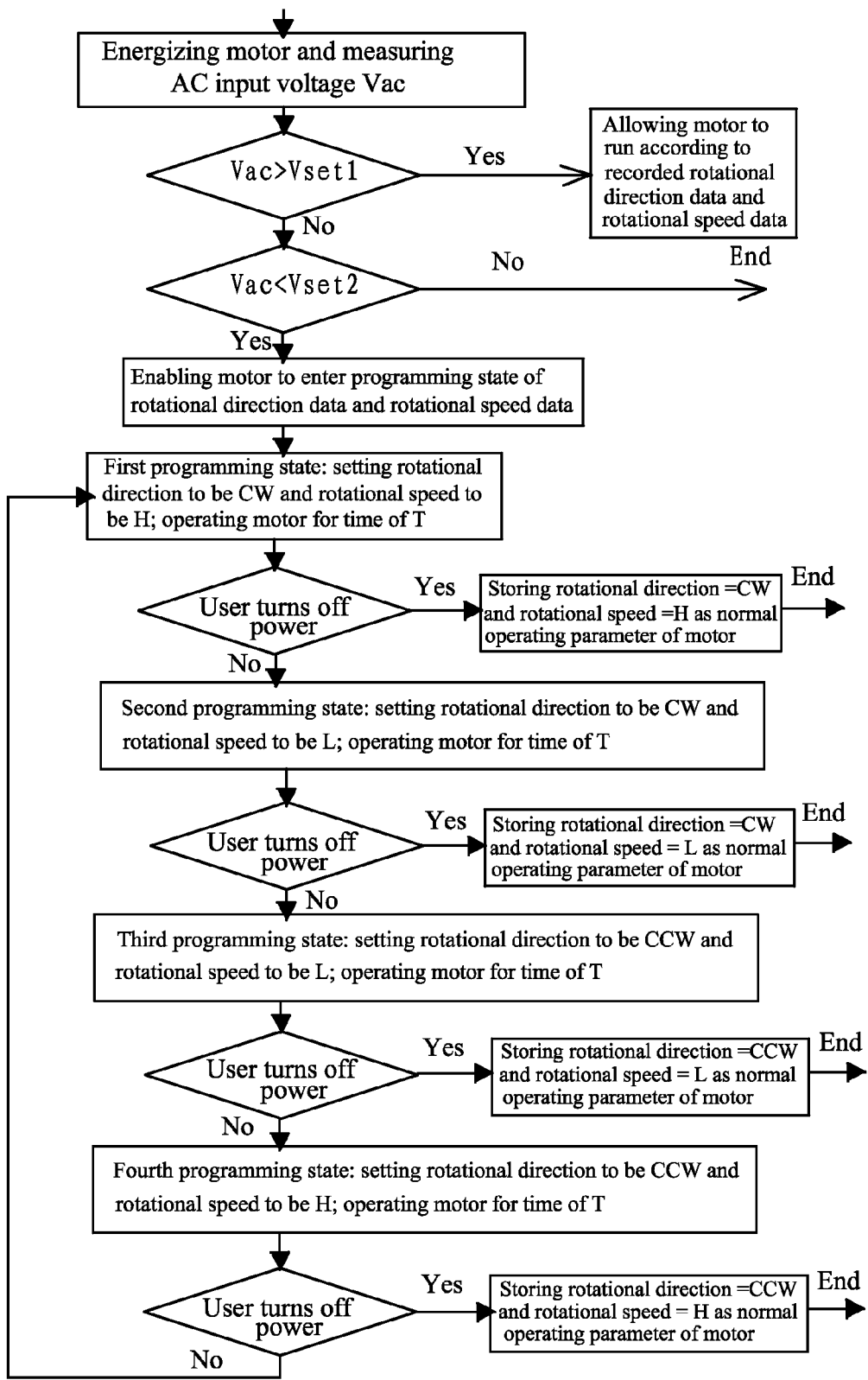
FIG. 6 is a second control flow diagram of a first method for setting parameters of an ECM motor according to one embodiment of the invention.

As shown in FIGS. 4 and 6, a method for setting parameters of an ECM motor for use as a PSC motor. The ECM motor comprises: a stator assembly, a rotor assembly, a housing assembly, and a motor controller. The motor controller comprises: a power circuit, a microprocessor, an inverter circuit, and a voltage measuring circuit. The voltage measuring circuit measures an AC input voltage Vac of an external input power. The power circuit supplies power to each circuit part. The voltage measuring circuit inputs a measured voltage signal into the microprocessor. The microprocessor controls the inverter circuit to drive the stator assembly. The method comprises the following steps:

1) energizing the motor and measuring the AC input voltage Vac;
2) allowing the motor to run according to recorded rotational direction data and rotational speed data when Vac>Vset1, in which, Vset1 represents a first set value of AC voltage;
3) enabling the motor to enter a programming state of rotational direction data and rotational speed data when Vac<Vset2, in which, Vset2 represents a second set value of AC voltage;
4) conducting the programming state comprising operating the motor in a rotational speed state, a rotational direction state, or a combined state thereof, with each state lasting for a time of T, respectively; and
5) determining that the programming state is proper when the user turns off the power; and storing the programming state in operation at the moment when the power is turned off as a normal operating parameter of the motor. The programming state comprises:

a first programming state: setting the rotational direction to be CW and the rotational speed to be H; operating the motor for the time of T, and assuming the state to be proper for the user when the user turns off the power; and storing the rotational direction=CW and the rotational speed=H as the normal operating parameter of the motor;

a second programming state: setting the rotational direction to be CW and the rotational speed to be L; operating the motor for the time of T, and assuming the state to be proper for the user when the user turns off the power; and storing the rotational direction=CW and the rotational speed=L as the normal operating parameter of the motor;

a third programming state: setting the rotational direction to be CCW and the rotational speed to be L; operating the motor for the time of T, and assuming the state to be proper for the user when the user turns off the power; and storing the rotational direction=CCW and the rotational speed=L as the normal operating parameter of the motor; and a fourth programming state: setting the rotational direction to be CCW and the rotational speed to be H; operating the motor for the time of T, and assuming the state to be proper for the user when the user turns off the power; and storing the rotational direction=CCW and the rotational speed=H as the normal operating parameter of the motor.

The method further comprises: selecting proper rotational direction data and proper rotational speed data when the user does not turn off the power in step 5), repeating step 4) and recycling the first programming state, the second programming state, the third programming state, and the fourth programming state until the user turns off the power; and selecting corresponding rotational direction data and rotational speed data of a certain programming state.

Vset1 is larger than or equal to 187 VAC voltage, and Vset2 is smaller than or equal to 138 VAC voltage.

Vset1 is between 208 V and 230 V AC voltage, and Vset2 is between 115V and 120V AC voltage.

The rotational direction data CW represents a clockwise direction in relation to a leading direction. The rotational direction data CCW represents a counter clockwise direction in relation to the leading direction. The rotational speed data H represents a high rotational speed in a range of between 975 rpm and 1175 rpm. The rotational speed data L represents a low rotational speed in a range of between 725 rpm and 925 rpm. The low rotational speed is preferably equal to 825 rpm. The high rotational speed is preferably equal to 1075 rpm. The time T for each of the first programming state, the second programming state, the third programming state, and the fourth programming state is less than 15 minutes.

Example 2

Figure 5:
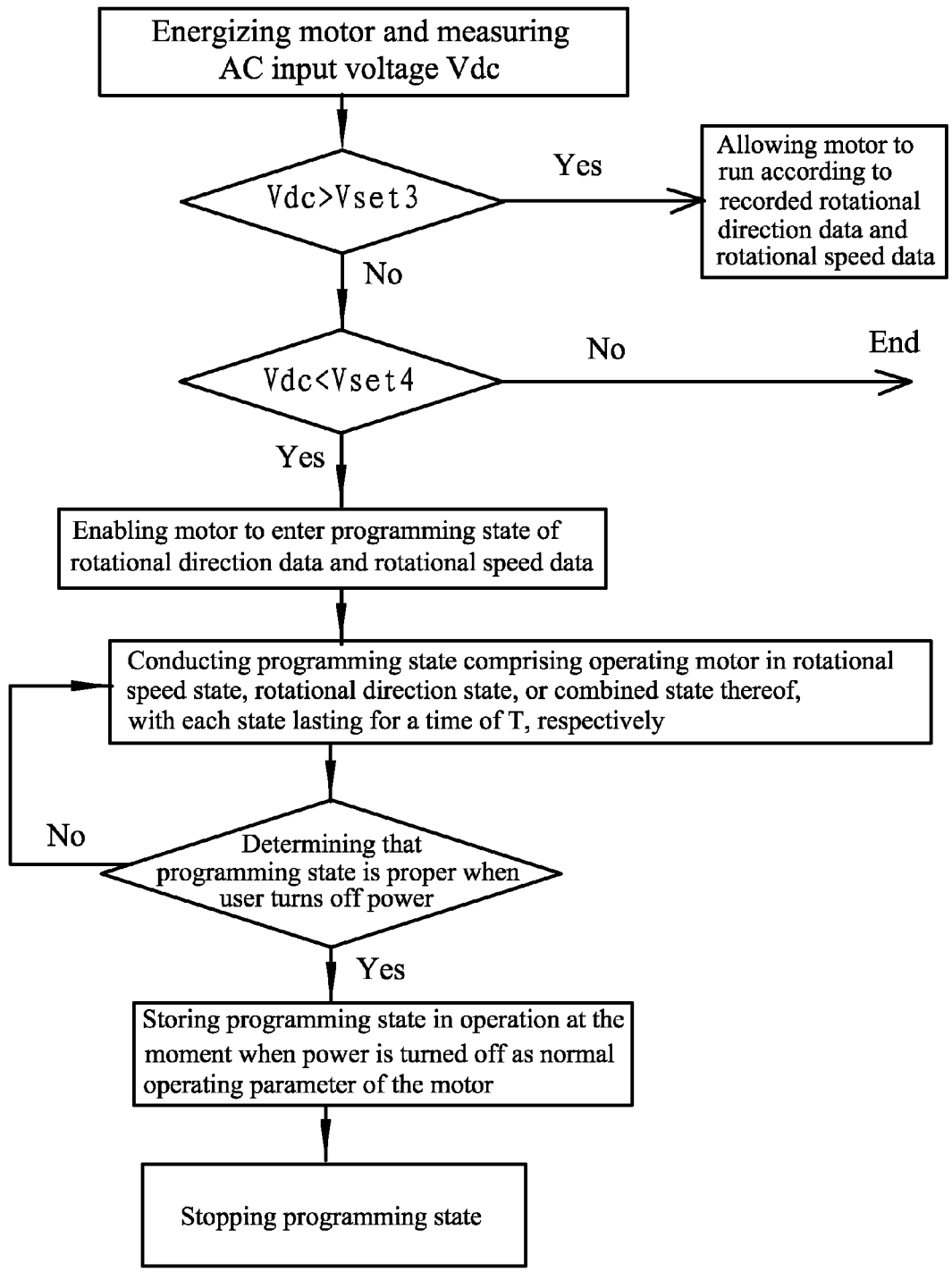
FIG. 5 is a first control flow diagram of a second method for setting parameters of an ECM motor according to one embodiment of the invention.
Figure 7:
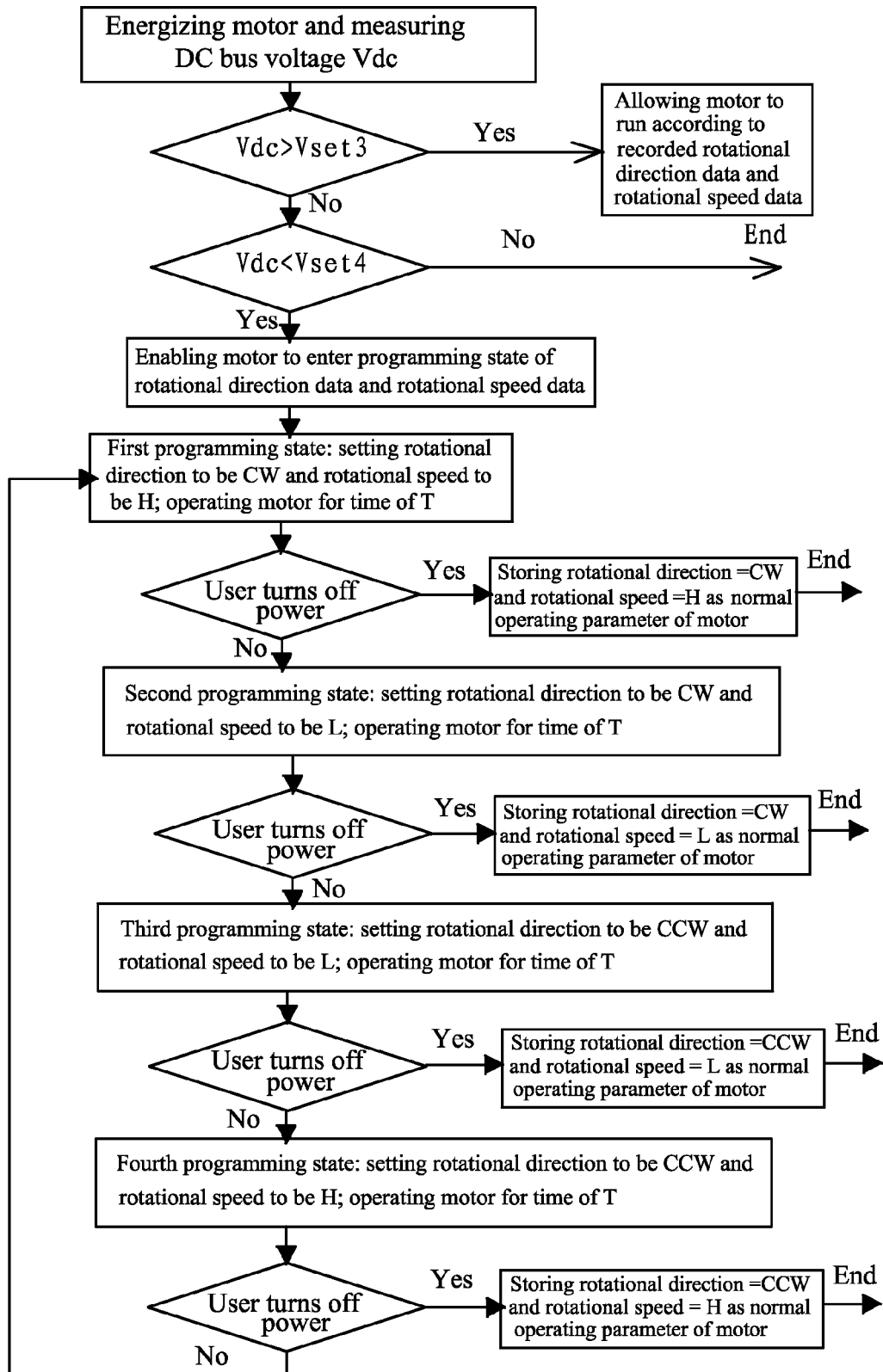
FIG. 7 is a second control flow diagram of a second method for setting parameters of an ECM motor according to one embodiment of the invention.

As shown in FIGS. 5 and 7, a method for setting parameters of an ECM motor for use as a PSC motor. The ECM motor comprises: a stator assembly, a rotor assembly, a housing assembly, and a motor controller. The motor controller comprises: a power circuit, a microprocessor, an inverter circuit, and a voltage measuring circuit. The voltage measuring circuit measures a DC bus voltage Vdc of an output end of the power circuit. The power circuit supplies power to each circuit part. The voltage measuring circuit inputs a measured voltage signal into the microprocessor. The microprocessor controls the inverter circuit to drive the stator assembly. The method comprises the following steps:

1) energizing the motor and measuring the DC bus voltage Vdc;
2) allowing the motor to run according to recorded rotational direction data and rotational speed data when Vdc>Vset3, in which, Vset3 represents a third set value of DC voltage;
3) enabling the motor to enter a programming state of rotational direction data and rotational speed data when Vdc<Vset4, in which, Vset4 represents a fourth set value of DC voltage;
4) conducting the programming state comprising operating the motor in a rotational speed state, a rotational direction state, or a combined state thereof, with each state lasting for a time of T, respectively; and
5) determining that the programming state is proper when the user turns off the power; and storing the programming state in operation at the moment when the power is turned off as a normal operating parameter of the motor.

In a class of this embodiment, the programming state comprises:

a first programming state: setting the rotational direction to be CW and the rotational speed to be H; operating the motor for the time of T, and assuming the state to be proper for the user when the user turns off the power; and storing the rotational direction=CW and the rotational speed=H as the normal operating parameter of the motor;

a second programming state: setting the rotational direction to be CW and the rotational speed to be L; operating the motor for the time of T, and assuming the state to be proper for the user when the user turns off the power; and storing the rotational direction=CW and the rotational speed=L as the normal operating parameter of the motor;

a third programming state: setting the rotational direction to be CCW and the rotational speed to be L; operating the motor for the time of T, and assuming the state to be proper for the user when the user turns off the power; and storing the rotational direction=CCW and the rotational speed=L as the normal operating parameter of the motor; and a fourth programming state: setting the rotational direction to be CCW and the rotational speed to be H; operating the motor for the time of T, and assuming the state to be proper for the user when the user turns off the power; and storing the rotational direction=CCW and the rotational speed=H as the normal operating parameter of the motor.

The method further comprises: selecting proper rotational direction data and proper rotational speed data when the user does not turn off the power in step 5); repeating step 4) and recycling the first programming state, the second programming state, the third programming state, and the fourth programming state until the user turns off the power; and selecting corresponding rotational direction data and rotational speed data of a certain programming state.

Vset3 is larger than or equal to $\sqrt{2} \times 187$ V DC voltage, and Vset4 is smaller than or equal to $\sqrt{2} \times 138$ V DC voltage.

The rotational direction data CW represents a clockwise direction in relation to a leading direction. The rotational direction data CCW represents a counter clockwise direction in relation to the leading direction. The rotational speed data H represents a high rotational speed in a range of between 975 rpm and 1175 rpm. The rotational speed data L represents a low rotational speed in a range of between 725 rpm and 925 rpm. The rotational speed data H is preferably 1075 rpm. The rotational speed data L is preferably 825 rpm. The time T for each of the first programming state, the second programming state, the third programming state, and the fourth programming state is less than 15 minutes.

It is simple and convenient for field debugging of the ECM motor for use as the PSC motor of the outdoor unit. The ECM motor is energized and the DC bus voltage Vdc or the AC input voltage Vac is measured. When the DC bus voltage Vdc or the AC input voltage Vac is larger than a certain set value, the motor runs at a normal working state according to the rotational direction data and the rotational speed data stored and recorded. When the DC bus voltage Vdc or the AC input voltage Vac is smaller than a certain set value, the motor enters a programming state of the rotational direction data and the rotational speed data. Four programming states are provided. The first programming state is setting the rotational direction to be CW and the rotational speed to be H; the second programming state is setting the rotational direction to be CW and the rotational speed to be L; the third programming state is setting the rotational direction to be CCW and the rotational speed to be L; and the second programming state is setting the rotational direction to be CCW and the rotational speed to be H. When the user turns off the power at a certain programming state, it is assumed that the state is proper for the user. The rotational direction data and the rotational speed data corresponding to the programming state are stored and recorded as the normal operating parameters of the motor. The debugging is simple and convenient, thereby being conducive to wide application of the ECM motor.

The ECM motor for use as the PSC motor of the outdoor unit is energized for field debugging in the empty load state by adopting an easily acquired low voltage, such as a standard 115-120 Vac or by adopting a self-carried 24 Vac of the HVAC system, the motor circularly operated in four combination of programming states (CW/H, CW/L, CCW/H, CCW/L). As long as a certain state meets the practical application requirement, just turn off the power, the operating state before the power off state will be automatically recorded by the motor.

The above example is not only applicable to the method for setting parameters of the ECM motor in substituting the PSC motor of the outdoor unit, but also applicable to the method for setting parameters of the ECM motor in substituting the PSC motor of the indoor unit.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for setting parameters of an electronically-commutated motor (ECM) for use as a permanent-split capacitor (PSC) motor,
    the ECM motor comprising: a stator assembly, a rotor assembly, a housing assembly, and a motor controller;
    the motor controller comprising: a power circuit, a microprocessor, an inverter circuit, and a voltage measuring circuit;
    the voltage measuring circuit measuring an AC input voltage Vac of an external input power; the power circuit supplying power to each circuit part; the voltage measuring circuit inputting a measured voltage signal into the microprocessor; the microprocessor controlling the inverter circuit to drive the stator assembly; and
    the method comprising the following steps:
    1) energizing the motor and measuring the AC input voltage Vac;
    2) allowing the motor to run according to recorded rotational direction data and rotational speed data when Vac>Vset1, in which, Vset1 represents a first set value of AC voltage;
    3) enabling the motor to enter a programming state of rotational direction data and rotational speed data when Vac<Vset2, in which, Vset2 represents a second set value of AC voltage;
    4) conducting the programming state comprising operating the motor in a rotational speed state, a rotational direction state, or a combined state thereof, with each state lasting for a time of T, respectively; and
    5) determining that the programming state is proper when the user turns off the power; and storing the programming state in operation at the moment when the power is turned off as a normal operating parameter of the motor.

2. The method of claim 1, wherein the programming state comprises:
    a first programming state: setting the rotational direction to be CW and the rotational speed to be H; operating the motor for the time of T, and assuming the state to be proper for the user when the user turns off the power; and storing the rotational direction=CW and the rotational speed=H as the normal operating parameter of the motor;
    a second programming state: setting the rotational direction to be CW and the rotational speed to be L; operating the motor for the time of T, and assuming the state to be proper for the user when the user turns off the power; and storing the rotational direction=CW and the rotational speed=L as the normal operating parameter of the motor;
    a third programming state: setting the rotational direction to be CCW and the rotational speed to be L; operating the motor for the time of T, and assuming the state to be proper for the user when the user turns off the power; and storing the rotational direction=CCW and the rotational speed=L as the normal operating parameter of the motor; and
    a fourth programming state: setting the rotational direction to be CCW and the rotational speed to be H; operating the motor for the time of T, and assuming the state to be proper for the user when the user turns off the power; and storing the rotational direction=CCW and the rotational speed=H as the normal operating parameter of the motor.

3. The method of claim 2, further comprising: selecting proper rotational direction data and proper rotational speed data when the user does not turn off the power in step 5), repeating step 4) and recycling the first programming state, the second programming state, the third programming state, and the fourth programming state until the user turns off the power; and selecting corresponding rotational direction data and rotational speed data of a certain programming state.

4. The method of claim 3, wherein
    the rotational direction data CW represents a clockwise direction in relation to a leading direction;
    the rotational direction data CCW represents a counter clockwise direction in relation to the leading direction;
    the rotational speed data H represents a high rotational speed in a range of between 975 rpm and 1175 rpm; and the rotational speed data L represents a low rotational speed in a range of between 725 rpm and 925 rpm.

5. The method of claim 4, wherein
the rotational speed data H is 1075 rpm; and
the rotational speed data L is 825 rpm.

6. The method of claim 3, wherein the time T for each of the first programming state, the second programming state, the third programming state, and the fourth programming state is less than 15 minutes.

7. The method of claim 1, wherein Vset1 is larger than or equal to 187 V AC voltage, and Vset2 is smaller than or equal to 138 VAC voltage.

8. The method of claim 7, wherein Vset1 is between 208 V and 230 VAC voltage, and Vset2 is between 115V and 120V AC voltage.

9. A method for setting parameters of an ECM motor for use as a PSC motor,
the ECM motor comprising: a stator assembly, a rotor assembly, a housing assembly, and a motor controller;
the motor controller comprising: a power circuit, a microprocessor, an inverter circuit, and a voltage measuring circuit;
the voltage measuring circuit measuring a DC bus voltage Vdc of an output end of the power circuit; the power circuit supplying power to each circuit part; the voltage measuring circuit inputting a measured voltage signal into the microprocessor; the microprocessor controlling the inverter circuit to drive the stator assembly; and
the method comprising the following steps:
1) energizing the motor and measuring the DC bus voltage Vdc;
2) allowing the motor to run according to recorded rotational direction data and rotational speed data when Vdc>Vset3, in which, Vset3 represents a third set value of DC voltage;
3) enabling the motor to enter a programming state of rotational direction data and rotational speed data when Vdc<Vset4, in which, Vset4 represents a fourth set value of DC voltage;
4) conducting the programming state comprising operating the motor in a rotational speed state, a rotational direction state, or a combined state thereof, with each state lasting for a time of T, respectively; and
5) determining that the programming state is proper when the user turns off the power; and storing the programming state in operation at the moment when the power is turned off as a normal operating parameter of the motor.

10. The method of claim 9, wherein the programming state comprises:
a first programming state: setting the rotational direction to be CW and the rotational speed to be H; operating the motor for the time of T, and assuming the state to be proper for the user when the user turns off the power; and storing the rotational direction=CW and the rotational speed=H as the normal operating parameter of the motor;
a second programming state: setting the rotational direction to be CW and the rotational speed to be L; operating the motor for the time of T, and assuming the state to be proper for the user when the user turns off the power; and storing the rotational direction=CW and the rotational speed=L as the normal operating parameter of the motor;
a third programming state: setting the rotational direction to be CCW and the rotational speed to be L; operating the motor for the time of T, and assuming the state to be proper for the user when the user turns off the power; and storing the rotational direction=CCW and the rotational speed=L as the normal operating parameter of the motor; and
a fourth programming state: setting the rotational direction to be CCW and the rotational speed to be H; operating the motor for the time of T, and assuming the state to be proper for the user when the user turns off the power; and storing the rotational direction=CCW and the rotational speed=H as the normal operating parameter of the motor.

11. The method of claim 10, further comprising: selecting proper rotational direction data and proper rotational speed data when the user does not turn off the power in step 5); repeating step 4) and recycling the first programming state, the second programming state, the third programming state, and the fourth programming state until the user turns off the power; and selecting corresponding rotational direction data and rotational speed data of a certain programming state.

12. The method of claim 11, wherein
the rotational direction data CW represents a clockwise direction in relation to a leading direction;
the rotational direction data CCW represents a counter clockwise direction in relation to the leading direction;
the rotational speed data H represents a high rotational speed in a range of between 975 rpm and 1175 rpm; and
the rotational speed data L represents a low rotational speed in a range of between 725 rpm and 925 rpm.

13. The method of claim 12, wherein
the rotational speed data H is 1075 rpm; and
the rotational speed data L is 825 rpm.

14. The method of claim 11, wherein the time T for each of the first programming state, the second programming state, the third programming state, and the fourth programming state is less than 15 minutes.

15. The method of claim 9, wherein Vset3 is larger than or equal to $\sqrt{2}\times 187$ V DC voltage, and Vset4 is smaller than or equal to $\sqrt{2}\times 138$ V DC voltage.

* * * * *